Oct. 15, 1957 — M. SWAN — 2,810,118
WIRING SYSTEM
Filed May 18, 1953 — 4 Sheets-Sheet 1
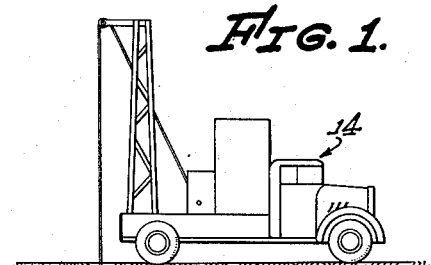
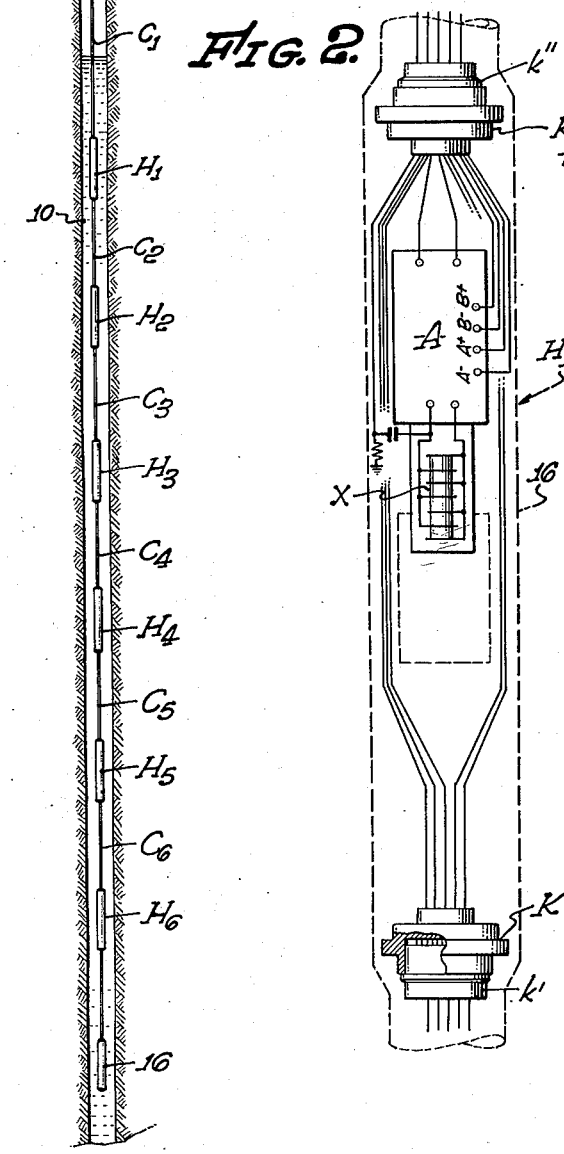
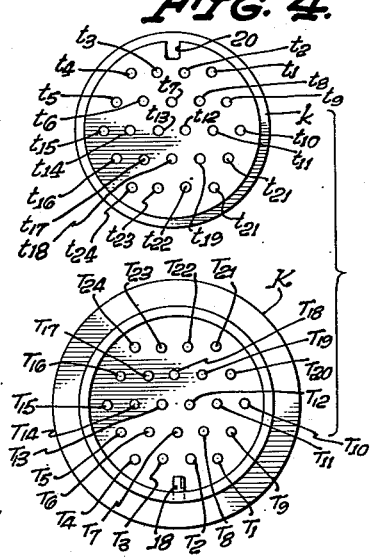
MERRILL SWAN, INVENTOR.
BY Reed & Lawlor
ATTORNEY.

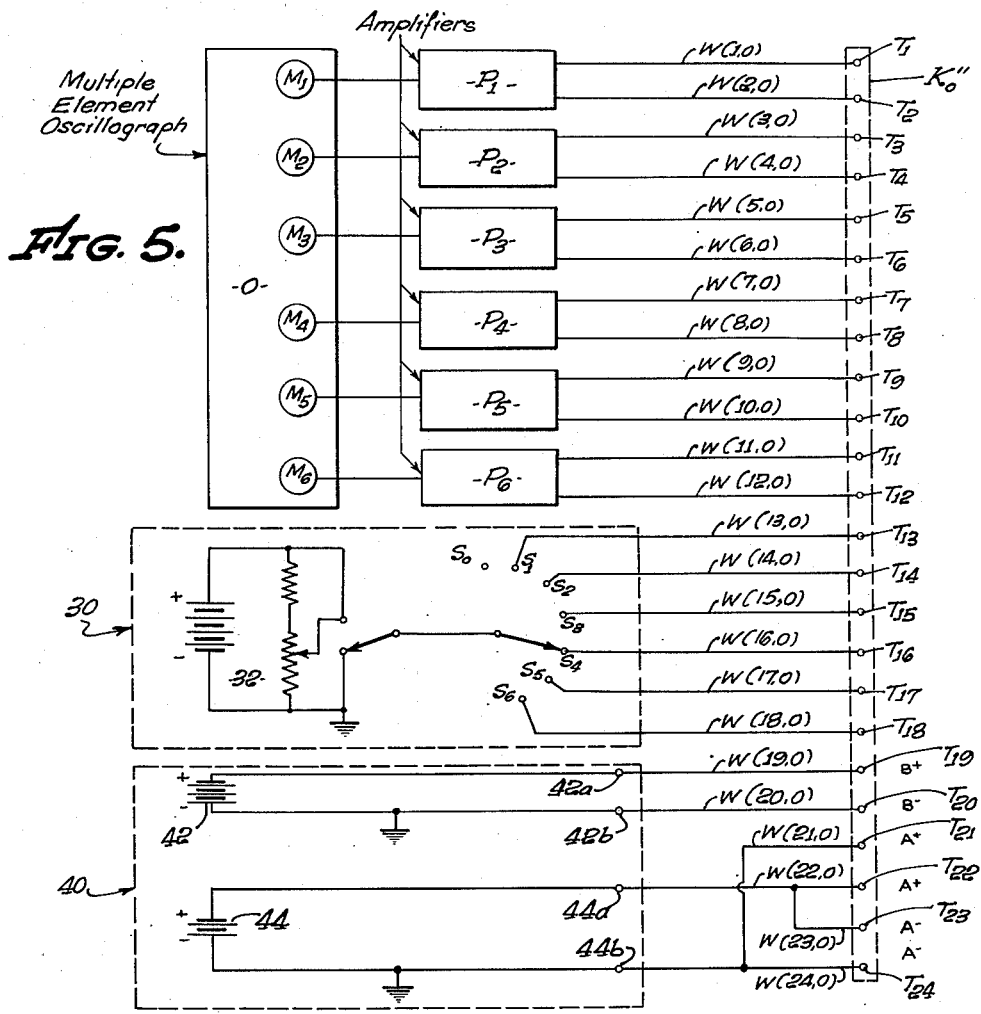

MERRILL SWAN, INVENTOR.

MERRILL SWAN, INVENTOR.

United States Patent Office 2,810,118
Patented Oct. 15, 1957

2,810,118

WIRING SYSTEM

Merrill Swan, Pasadena, Calif., assignor, by mesne assignments, to United Geophysical Corporation, Pasadena, Calif., a corporation of California Application May 18, 1953, Serial No. 355,507

5 Claims. (Cl. 340—15)

This invention relates to improvements in electrical circuits, and more particularly to an improved means for connecting a plurality of series of similar electrical units in a coordinated relationship.

While this invention is applicable to many different fields, it will be described below in connection with a specific type of seismic prospecting system, and even though the invention is described only in connection with that specific application, it is to be understood that it may be employed in many other ways without departing from its fundamental principles.

In a system of seismic prospecting described and claimed in copending patent application of Raymond A. Peterson Serial No. 319,969, now Patent No. 2,792,067, seismic waves are generated at a point in a shothole and, after being refracted and reflected from subsurface strata, the waves are received at a series or string of hydrophones or other seismometers or geophones that are arranged in a vertical line in a receiver hole that has been drilled into the earth. The various hydrophones are located at different depths and they are connected by means of cables to a series of amplifiers at the surface and thence to a series of galvanometers in a multiple-element oscillograph also at the surface of the earth. In practice, each of the galvanometers is associated with a hydrophone at a particular location in the series, the positions of the galvanometers in the oscillograph being coordinated with the positions of the hydrophones in the string.

As explained in my copending patent application, Serial No. 355,508, now Patent No. 2,717,368, it is desirable to test the various hydrophones while they are actually connected in series in a string or even while they are actually in place in a receiver hole. To make such tests expeditiously, it is desirable to employ a switching device at the surface of the earth which has a series of contacts having positions coordinated with the positions of the hydrophones in the string. Furthermore, in the particular system being considered here, the hydrophones employ preamplifiers and it is desirable to energize these preamplifiers from a common power supply that is located at the surface of the earth. Inasmuch as all of the hydrophones are of the same design, it is desirable to energize them all in substantially the same way.

In practice, each of the hydrophones employs a multiple contact male electrical connector or socket at its ends and the various hydrophones are connected in a series by means of interconnecting or "jumper" cables which employ multiple contact female connectors or plugs at their ends that mate with the hydrophone connectors. In addition, the uppermost hydrophone is connected by means of another interconnecting or truck cable with recording equipment including the oscillograph, testing equipment, and the power supply, all located on a truck at the surface of the earth.

One of the objects of this invention is to provide a series of identical interconnecting cables and a series of identical hydrophones, each of which contains the same arrangement of connections between its connectors and parts contained therein which will permit the connection of the hydrophones and the jumper cables in any arbitrary sequence without disturbing the coordination of the positions of the hydrophones in the series with the associated apparatus at the surface of the earth and without disturbing the connections to the power supply. In order to accomplish this object, some of the connections between corresponding contacts of the lower and upper connectors are rotated between the output of one hydrophone and the output of the next in the series so that these connections to the hydrophones are advanced in sequence as the connections progress up the string. By virtue of this arrangement, it is possible to connect the cables and the hydrophones in any sequence whatsoever and still be assured that each of the hydrophones is connected to particular output terminals of the truck cable according to the position of the hydrophones in the series. In one way of achieving this result, the rotation of connections occurs within the hydrophones. In another, the rotation occurs in the jumper cables.

Another object of the invention is to provide an arrangement for assuring proper coordination of the positions of the hydrophones with a plurality of devices at the surface of the earth and still assure that all of the hydrophones are connected in the same manner to the common power supply. This object is accomplished by rotating the connections between certain of the contacts and not rotating the connections of certain other groups of contacts.

Another object of the invention is to provide an arrangement in which different types of devices requiring different numbers of connections are each connected to different hydrophones in the series according to the positions of the hydrophones and irrespective of the sequence in which the hydrophones are connected. This result is accomplished by rotating certain connections by one amount and certain other connections by another amount.

The foregoing and other objects of the invention, together with various advantages thereof, will be more readily understood from the following description taken in connection with the accompanying drawings which are for purpose of illustration only, and in which:

Fig. 1 is a vertical cross-sectional view of the earth illustrating the use of a string of hydrophones in place;

Fig. 2 is a schematic diagram of an individual hydrophone;

Fig. 3 is an isometric view of a pair of mating connectors;

Fig. 4 is a plan view of a pair of mating connectors;

Fig. 5 is a schematic diagram of the truck equipment;

Fig. 8 is a diagram showing how Figs. 5 and 6 are assembled to form a complete system; and Fig. 9 is a diagram showing how Figs. 5 and 7 may be assembled to form an alternative embodiment of the invention.

Figure 6:
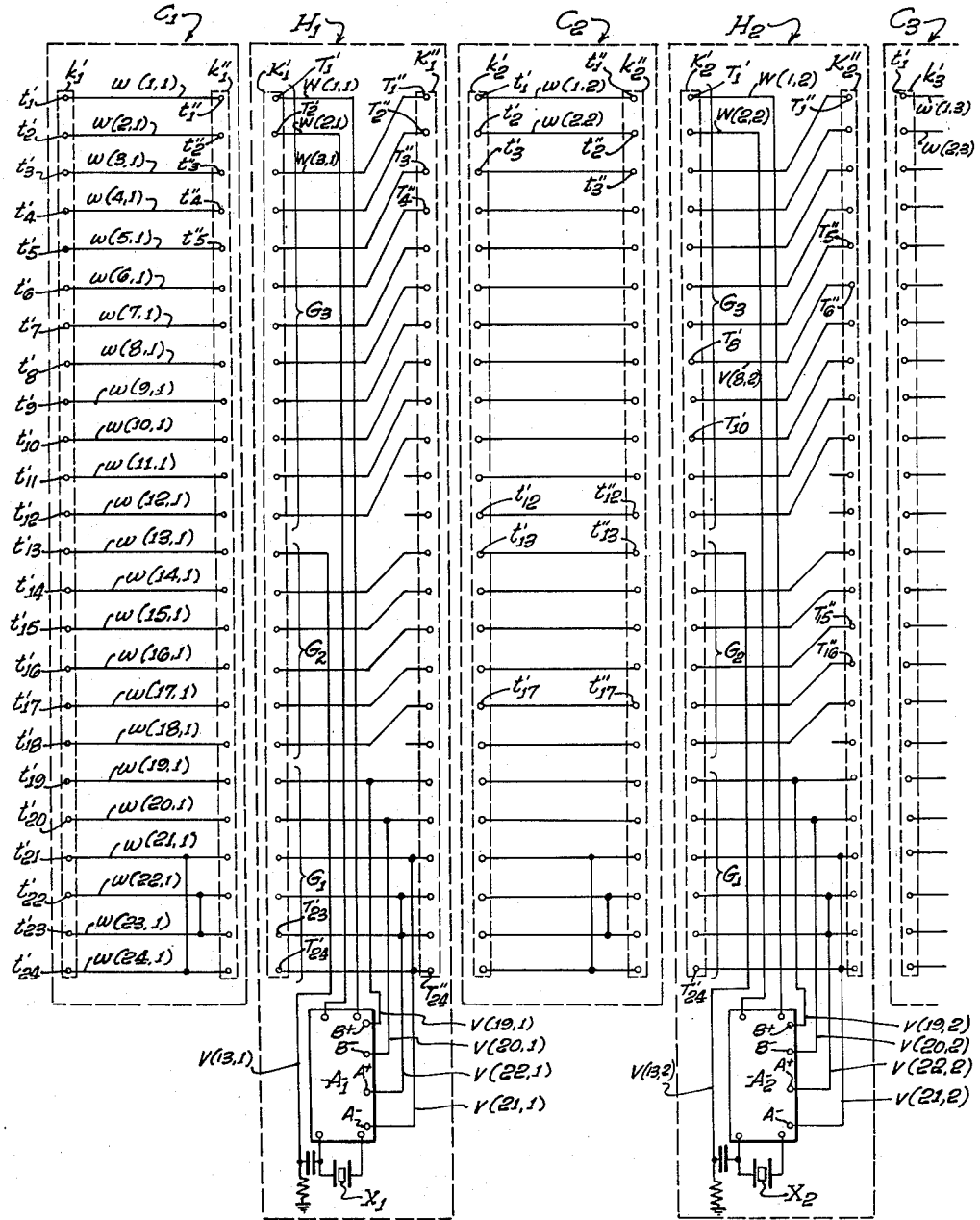
Fig. 6 is a schematic diagram showing the wiring connection in a string of hydrophones, embodying the invention.

Referring to the drawings, and particularly to Fig. 1, there is illustrated a string of hydrophones $H_1 \ldots H_6$ arranged in series in a receiver hole 10 filled with fluid. The top hydrophone $H_1$ is connected to the equipment in the truck 14 by means of a truck cable $C_1$, and the hydrophones are connected in the series by means of a series of interconnecting or jumper cables $C_2 \ldots C_6$. The hydrophones $H_1 \ldots H_6$ are arranged in the order mentioned from top to bottom. Likewise, the jumper cables $C_2 \ldots C_6$ are arranged in the order mentioned from top to bottom. The cables and the hydrophones are arranged alternately in the string so that the uppermost jumper cable $C_2$ is connected between the first and second hydrophones $H_1$ and $H_2$, the second jumper cable $C_3$ is connected between the second and third hydrophones $H_2$ and $H_3$, etc. Interconnecting strength cables (not shown) are employed to support the hydrophones. A weight 16 is connected to the lowermost hydrophone $H_6$ by means of a strength cable. Usually the uppermost cable $C_1$ is relatively long compared to the other cables $C_2 \ldots C_6$ and all of the latter cables are of the same length so that the hydrophones $H_1 \ldots H_6$ may be uniformly spaced in the string. The uppermost cable $C_1$ is arranged on a winch on the truck to enable the string of hydrophones to be lowered to any desired depth in the hole 10.

In use, as explained in said patent application Serial No. 319,969, now Patent No. 2,792,067, hereinbefore referred to, a train of seismic waves travelling upwardly in the earth arrives at the string of hydrophones and is detected by the hydrophones $H_6, H_5 \ldots H_1$ in turn, being received by the lowermost hydrophone first and by the uppermost hydrophone last. As the waves are detected at each hydrophone, they are converted into corresponding electrical waves which are transmitted through the cables to the equipment on the truck 14. As explained more fully hereinbelow, waves received at each hydrophone are recorded by a particular galvanometer on the truck, the positions of the galvanometers being coordinated with the positions of the hydrophones so that the relative positions of the respective galvanometer traces on the resulting record indicate the relative positions of the hydrophones in their series. From an examination of the record produced by the oscillograph and a knowledge of the depth of one hydrophone and knowledge of the distances between hydrophones, the depths at which the waves have been detected can be readily ascertained.

A hydrophone of the type to which the present invention is applicable is described and claimed in co-pending patent application of Edgar T. Howes and William F. Hoy, Serial No. 366,030, now Patent No. 2,757,355. As more fully explained in that application, each of the hydrophones H includes a sealed casing 16 in which is mounted a piezo-electric detector X, a preamplifier A, an upper, or output, or second connector K' and a lower, or input, or first connector K''. The piezo-electric detector X is subjected to the influence of changes of pressure in the well fluid, producing corresponding electromotive forces which are applied to the input of the preamplifier A. The resultant amplified signals are led by conductors connected to the outputs of the preamplifier A to contacts in the upper connector K'. In order to facilitate transmission of signals from a lower hydrophone through one of the upper hydrophones, contacts in the lower connector K'' are connected to contacts in the upper connector K' by means of wires within the hydrophone casing.

The two connectors K' and K'' of each hydrophone are in the form of sockets with external male contacts or prongs. Mated with the upper hydrophone connector K' is a female plug $k''$ at the bottom of the next upper cable. Mated with the lower hydrophone connector K'' is a female plug $k'$ at the top of the next lower cable. All of the hydrophone connectors K are of identical construction and all of the cable connectors $k$ are also of identical construction.

In this application the symbols K' and K'' are employed to refer to upper and lower connectors of the hydrophones and integers 1 . . . 6, generally in the subscript position, are employed to designate identical parts in particular hydrophones $H_1 \ldots H_6$. Similarly, the symbols $k'$ and $k''$ are employed to refer to upper and lower connectors of the jumper cables and integers 1 . . . 6, generally in the subscript position are employed to designate identical parts in particular cables $C_1 \ldots C_6$. The subscript 0 is employed to designate similar parts that are located on the recording truck 14. Generally, similar parts present in both cables and hydrophones are designated by small and capital letters respectively.

In order to simplify identification of the wires that are connected to the various contacts of the respective connectors, the symbol $w(r,a)$ is employed is employed to designate a wire in a cable $C_a$ and the symbols $V(s,a)$ and $W(s,a)$ are employed to designate a wire in a hydrophone $H_a$.

In these expressions, the letters "$r$," "$s$" and "$a$" have the following meanings:

$r =$ the number of the contact to which the wire $w(r,a)$ is connected in the upper or output connector of the cable $C_a$.

$s =$ the number of the contact to which the wire $W(s,a)$ is connected in the upper or output connector of the hydrophone $H_a$.

$a =$ the number of the cable or the hydrophone in which the wire is located.

The expression $W(a,0)$ is employed to designate wires in the truck itself.

In Figs. 3 and 4 the general construction of a pair of mating connectors $k$ and K is indicated. Each of the hydrophone connectors K is provided with a key 18 and each of the cable connectors $k$ is provided with a slot or keyway 20 which is employed to mate or register each cable connector $k$ with the hydrophone connector K in which it is placed.

Each of the hydrophone connectors K comprises twenty-four mutually insulated contacts $T_1, T_2 \ldots T_{24}$. The contacts in each of the hydrophone connectors are arranged symmetrically about two perpendicular axes and in a predetermined numerical sequence. Thus, when viewing the contact with the key 18 at the bottom, the first row of contacts adjacent the key 18 includes contacts $T_1 \ldots T_4$ arranged sequentially from left to right. The second row comprises contacts $T_5 \ldots T_9$ arranged sequentially from right to left. The third row comprises contacts $T_{10} \ldots T_{15}$ arranged from right to left. The fourth row comprises contacts $T_{16} \ldots T_{20}$ arranged from left to right, and the last row comprises contacts $T_{21} \ldots T_{24}$ arranged from right to left. The various contacts are uniformly spaced in the respective rows. In this construction, it will be noted that the upper and lower rows are located symmetrically with respect to the center row and that all of the rows are symmetrical about a line transverse thereto. Furthermore, it will be noted that the sequential arrangement possesses a diametrical symmetry in which the $n$th contact $T_n$ is diametrically opposite from the $(25-n)$th contact $T_{25-n}$.

Each of the cable connectors also comprises twenty-four mutually insulated contacts $t_1, t_2 \ldots t_{24}$. The contacts in each of the cable connectors are also arranged symmetrically about two perpendicular axes. Thus, when viewing the contacts $t$ with the slot 20 at the top, the first row of contacts adjacent the slot 20 includes contacts $t_1 \ldots t_4$ arranged sequentially from right to left. The second row comprises contacts $t_5 \ldots t_9$ arranged from left to right. The third row comprises contacts $t_{10} \ldots t_{15}$ arranged from right to left. The fourth row comprises contacts $t_{16} \ldots t_{20}$ arranged from left to right, and the last row comprises contacts $t_{21} \ldots t_{24}$ arranged from right to left. The spacing of the contacts in each cable connector is the same as that of a hydrophone connector so that they may be mated in registry. In this construction too, it will be noted that the upper and lower rows are located symmetrically with respect to the center row and that all of the rows are symmetrical about a line transverse thereto. Furthermore, again it will be noted that the sequential arrangement possesses a diametrical symmetry in which the $n$th contact $t_n$ is diametrically opposite from the $(25-n)$th contact $t_{25-n}$.

In this specification, the term "corresponding contacts" is employed with reference to the contacts of the upper and lower hydrophone connectors which are similarly located with respect to the keys thereof. Similarly, the term "corresponding contacts" is employed with reference to the contacts of the upper and lower cable connectors which are similarly located with respect to the slots thereof. Also the term "corresponding contacts" of a cable connector and a hydrophone connector is employed to designate those contacts of the two connectors which are mated with each other when the two connectors are placed together in proper registry with the key 18 of the hydrophone connector K located in the slot 20 of the cable connector k. While this exact arrangement is not required in practicing the invention, and while other types of correspondence may be employed to achieve the results of this invention, it is nevertheless a simple and convenient type of correspondence to employ in practice and with reference to which the invention may be readily explained.

This invention deals with the system for connecting the wires between the contacts of the upper and lower hydrophone connectors and between the contacts of the upper and lower cable connectors which facilitates interchangeability of hydrophones and interchangeability of cables without disturbing the coordination between the various parts of the equipment on the truck and the hydrophones in the string.

As indicated in Fig. 5, the equipment on the truck 14 includes amplifiers $P_1 \ldots P_6$, testing equipment 30, and a power supply 40.

The outputs of the amplifiers $P_1 \ldots P_6$, are connected respectively to corresponding galvanometers $G_1 \ldots G_6$ of a multiple-element oscillograph 0. The input of the first amplifier P is connected by means of wires $W(1,0)$ and $W(2,0)$ with a first pair of contacts $T_1$, $T_2$ of the truck input connector $K_0''$. Generally speaking, a pair of wires $W(2p-1,0)$ and $W(2p,0)$ connect the inputs of each of the other amplifiers $P_p$ to a pair of contacts $T_{2p-1}$ and $T_{2p}$ of the truck input connector $K_0''$ where $p=1, 2 \ldots$ or 6.

A testing circuit 30 is also located on the recording truck. The testing circuit includes an "off" contact $S_0$ and a series of testing contacts $S_1 \ldots S_6$ for applying signals from signal source 32 to the respective corresponding hydrophones $H_1 \ldots H_6$. This testing circuit, as explained more fully in copending patent application Serial No. 355,508, now Patent No. 2,717,368, hereinbefore referred to, is employed for testing the hydrophones separately while they are connected in a string and installed in place. For this purpose, each of the testing contacts $S_1 \ldots S_6$ is connected to corresponding contacts $T_{13} \ldots T_{18}$ of the connector $K_0''$ by means of corresponding wires $W(13, 0) \ldots W(18, 0)$. That is, each of the testing contacts $S_q$ is connected to a contact $T_{12+q}$ by means of a wire $W_{12+q}$ where $q=1, 2, 3 \ldots$ or 6.

The truck recorder also includes a power supply 40, including both a B supply 42 and A supply 44. The positive and negative terminals 42a and 42b of the B supply are respectively connected by means of wires $W(19, 0)$ and $W(20, 0)$ to contacts $T_{19}$ and $T_{20}$ respectively of the truck connector $K_0''$. Likewise the positive and negative terminals 44a and 44b of the A supply are connected by means of wires $W(21, 0)$ and $W(22, 0)$ to Contacts $T_{12}$ and $T_{22}$ of the truck connector $K_0''$. In order to facilitate carrying high currents in the cables that lead to the hydrophones, contacts $T_{21}$ and $T_{23}$ are bridged by a short wire and contacts $T_{22}$ and $T_{24}$ are likewise bridged by a short wire.

In Fig. 6 there is illustrated a string of hydrophones in which the truck cable input connector $k_1''$ is plugged into output connector $K_1'$ of the first hydrophone $H_1$, the cable output connector $k_2'$ of the first jumper cable $C_2$ is plugged into the lower connector $K_1''$ of the first hydrophone, the cable input connector $k_2''$ of the first jumper cable $C_2$ is plugged into the upper connector $K_2$ of the second hydrophone $H_2$, the cable output connector $k_3'$ of the second jumper cable $C_3$ is plugged into the lower connector $K_2''$ of the second hydrophone $H_2$, etc. As indicated in the assembly diagram of Fig. 8, the string of hydrophones is connected to the truck equipment by plugging the truck cable output connector $k_1'$ into the truck input connector $K_0''$.

As shown in Fig. 6 each of the other contacts $t_r'$ of the upper connector $k_1'$ of the truck cable $C_1$ is connected with the corresponding contact $t_r''$ of the lower connector $k_1''$ thereof by means of a wire $w(r, 1)$, where $r=1 \ldots$ or 24. For example, the contact $t_1'$ of the upper or output, or second connector $k_1'$ of the truck cable $C_1$ is connected by a wire $w(1, 1)$ of the contact $t_2''$ of the lower or input, or first connector $k_1''$ thereof. In a similar manner, the corresponding contacts of the upper and lower connectors $k'$ and $k''$ of each of the jumper cables are likewise connected by corresponding wires. In each of the cables $C_a$ the wires $W(21, a)$ and $W(24, a)$ are connected by one bridge wire and the wires $W(22, a)$ and $W(23, a)$ are connected by another bridge wire.

The contacts of each of the hydrophones H are divided into three groups: $G_1$, $G_2$, and $G_3$. The first group of contacts $G_1$ includes six contacts $T_{19} \ldots T_{24}$ which are connected to the power supply 40. The second group of contacts $G_3$ includes twelve contacts $T_1 \ldots T_{12}$ which are connected to the amplifiers $P_1 \ldots P_6$. The third group of contacts $G_3$ includes six contacts $T_{13} \ldots T_{18}$ which are connected to the testing circuit 30.

In the first group of contacts $G_1$ of each of the hydrophones, one of the upper contacts $T_s'$ of the upper connector $K_a''$ is connected to a corresponding contact $T_s''$ of the lower connector $K_a''$ by means of a wire $W(s, a)$ where $s$ equals 19 ... or 24 and $a$ equals 1 ... or 6. In each of the hydrophones $H_a$ the wires $W(21, a)$ and $W(24, a)$ may be connected by one bridge wire and the wires $W(22, a)$ and $W(23, a)$ by another bridge wire. The power terminals B+, B−, A+, and A− of the amplifier $A_a$ of each hydrophone $H_a$ are connected to the wires $W(19, a)$, $W(20, a)$, $W(21, a)$ and $W(22, a)$ respectively by means of auxiliary connecting wires $V(19, a)$, $V(20, a)$, $V(21, a)$ and $V(22, a)$ in the respective hydrophones. By virtue of the foregoing arrangement, the high voltage side of B+ of the B supply is connected to the B+ terminal of each of the amplifiers $A_1$, $A_2$, etc., through the truck wire $W(19, 0)$, the cable wires and hydrophone wires $w(19, 1)$, $W(19, 1)$, $w(19, 2)$, $W(19, 2)$, etc., and through the respective auxiliary connecting wires $V(19, 1)$, $V(19, 2)$ etc. Similarly the grounded side B− of the B supply is connected to the B− terminal of each of the amplifiers $A_1$, $A_2$, etc., through the truck wire $W(20, 0)$, the cable wires and hydrophone wires $w(20, 1)$, $W(20, 1)$, $w(20, 2)$, $W(20, 2)$, etc., and through the respective auxiliary connecting wires $V(20, 1)$, $V(20, 2)$, etc. In a similar manner the positive side A+ of the A supply is connected to the A terminal of each of the amplifiers $A_1$, $A_2$, etc., through the truck wire $W(21, 0)$, the cable wires and hydrophone wires $w(21, 1)$, $W(21, 1)$, $w(21, 2)$, $W(21, 2)$, etc., and also the wires $w(24, 1)$, $W(24, 1)$, $w(24, 2)$, $W(24, 2)$, etc., that are connected in parallel therewith and through the respective auxiliary connecting wires $V(21, 1)$, $V(21, 2)$, etc. Also the grounded negative side A− of the A supply is connected to the A− terminal of each of the amplifiers $A_1$, $A_2$, etc., through the truck wire $W(22, 0)$, the cable wires and hydrophone wires $w(22, 1)$, $W(22, 1)$, $w(22, 2)$ $W(22, 2)$, etc., and also the wires $w(23, 1)$, $W(23, 1)$, $w(23, 2)$, $W(23, 2)$, etc., that are connected in parallel therewith and through the respective auxiliary connecting wires $V(22, 1)$, $V(22, 2)$ etc.

The contacts of the second group $G_2$ of contacts of each of the hydrophones are arranged sequentially in six pairs, namely, $T_{2p}$ and $T_{2p-1}$, where $p=1 \ldots$ or 6. In each hydrophone $H_a$ the first pair of the second group of contacts of the upper connector K′, namely, contacts $T_1'$ and $T_2'$ are connected by means of wires $V(1, a)$ and $V(2, a)$ to the output terminals of the corresponding preamplifier $A_a$ where $a=1 \ldots 6$. Each of the remaining pair of contacts $T_{2p}'$ and $T_{2p-1}'$ of the second group $G_2$ of the upper connector $K'$ of each hydrophone is connected by means of a wire $W(2p, 1)$ and $W(2p-1, 1)$ with the $(2p-2)$th and the $(2p-3)$th contacts $T_{2p-2}''$ and $T_{2p-3}''$, respectively, of the lower connector $K''$ thereof where $p=2 \ldots$ or 6. For example, the fourth pair of upper contacts $T_8'$ and $T_7'$ of the second hydrophone $H_2$ are connected by wires $W(8, 2)$ and $W(7, 2)$ with the third pair of lower contacts $T_6''$ and $T_5''$ thereof. In effect, the connections between the upper and lower contacts of the second group $G_2$ are rotated within each of the hydrophones, being retarded or stepped by two positions. By virtue of this arrangement, the output of each preamplifier is advanced or rotated in steps of two between the output connector of each hydrophone $H_a$ and the output connector of the next upper hydrophone $H_{a-1}$ in the series. As a result of the rotation of the connections in the second group of contacts $G_2$ of the hydrophones, the output of the first hydrophone preamplifier $A_1$ is connected to the input of the first recorder amplifier $P_1$ and the output of the second hydrophone amplifier $A_2$ is connected to the input of the second recorder amplifier $P_2$ and so on. Thus, the positions of the hydrophones in the string are coordinated exactly with the positions of the corresponding galvanometers in the multiple-element oscillograph. It will be noted that the last pair of contacts $T_{11}''$ and $T_{12}''$ of the lower connector $K''$ of each hydrophone remain unused and that all of the wires that are connected thereto by means of the connections in the cables and hydrophones therebeneath, are not connected in any way to the truck equipment.

With the arrangement described above, any two hydrophones may be interchanged without disturbing the coordination between the positions of the hydrophones in the series and the positions of the galvanometers at the recorder. Likewise, since the cables $C_1 \ldots C_6$ are all provided with straight-through connections, they also may be interchanged without disturbing the coordination of the positions of the hydrophones with the positions of the galvanometers $G_1 \ldots G_6$. Accordingly when seismic waves are received by the string of hydrophones, the waves are recorded by the galvanometers in accordance with the positions of the hydrophones and irrespective of the sequence in which the hydrophones and jumper cables are connected.

The contacts of the third group $G_3$ of contacts of each of the hydrophones are arranged sequentially in numerical order $T_{13} \ldots T_{18}$. In each hydrophone $H_a$ the first contact of the third group of contacts of the upper connector $K'$, namely contact $T_3''$, is connected by means of a wire $V(13, a)$ to the grounded input terminal of the corresponding preamplifier $A_a$ where $a=2 \ldots$ or 6. Each of the remaining contacts $T_s'$ of the upper connector $K'$ of each hydrophone is connected by means of a wire $W(s, a)$ with the $(s-1)$th contact $T_{s-1}''$ of the lower connector $K''$ thereof where $s=14 \ldots$ or 18. For example, the fourth upper contact of the third group of the second hydrophone, namely contact $T_{16}$ of the upper connector, is connected by wire $W(16, 2)$ with the third lower contact $T_{15}$ thereof. In effect, the connection between the upper and lower contacts of the third group $G_3$ are rotated within each of the hydrophones, being retarded or stepped in the sequence by one position. By virtue of this arrangement each test circuit associated with piezo-electric detector $X$ is advanced or rotated in steps of one between the output connector of each hydrophone $H_a$ and the output connector of the next upper hydrophone $H_{a-1}$ in the series. As a result of the rotation of the connections in the third group of contacts $G_3$ of the hydrophones, the piezo-electric detector $X_1$ of the first hydrophone $H_1$ is connected to the first testing contact $S_1$, and the piezo-electric detector $X_2$ of the second hydrophone $H_2$ is connected to the second testing contact $S_2$ and so on. Thus positions of the hydrophones in the string are coordinated exactly with the positions of the corresponding testing contacts in the testing unit 30. It will be noted that the last contact of the lower connector $K''$ of each hydrophone remains unused and that all of the wires that are connected to any one of such contacts are not connected in any way to the truck equipment, except through the conventional ground.

With this arrangement, any two hydrophones may be interchanged without disturbing the coordination between the positions of the hydrophones in the series and the positions of the testing contacts. Likewise, since the cables $C_1 \ldots C_6$ are all provided with straight-through connections, they also may be interchanged without disturbing the coordination of the positions of the hydrophones with the positions of the galvanometers $G_1 \ldots G_6$.

Accordingly, the testing circuit 30 may be operated at any desired position corresponding to one of the switch contacts $S_1 \ldots S_6$ with the assurance that a test may be made of the corresponding piezoelectric detector $X_1 \ldots X_6$ in the string according to the position of the detector in the cable and irrespective of the sequence in which the hydrophones and jumper cables are connected merely by operating the appropriate switch contact.

Figure 7:
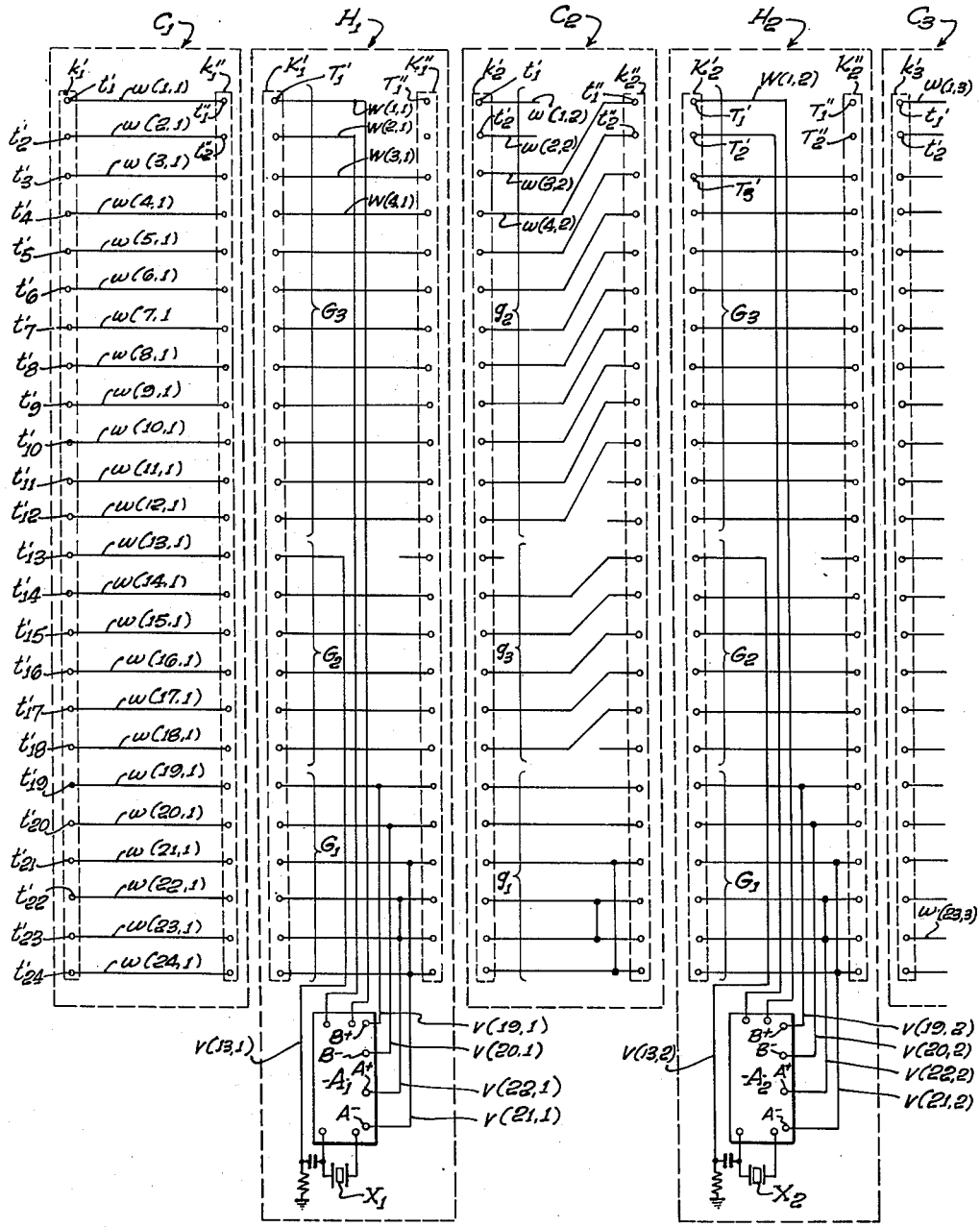
Fig. 7 is a wiring diagram of an alternate embodiment of the invention.

In Fig. 7 there is illustrated a second string of hydrophones embodying the present invention in a slightly different form. As indicated in the assembly diagram of Fig. 8, this string of hydrophones is also connected to the truck equipment by plugging the truck cable output connector $k_1'$ into the truck input connector $K_0''$.

As shown in Fig. 7, the wiring connections between the upper connector $k_1'$ and the lower connector $k_1''$ of the truck cable are identical with that previously described. However, in this form of the invention, the rotation of the connections occurs in the jumper cables and no rotation of connections occurs in the hydrophones, though it is possible for some rotation to occur in one and some in the other.

More particularly, in this form of the invention the first and second contacts, $T_1'$ and $T_2'$ of the upper connector of each of the hydrophones are connected to the output of the corresponding preamplifier $A$ as previously. The remaining contacts $T_r'$, except upper contact $T_{13}'$, of the upper connectors $K'$ of each of the hydrophones are connected by a corresponding wire $W(r, 1)$ to the corresponding contacts $T_r''$ of the lower connector thereof, where $r$ equals $3 \ldots 12, 14 \ldots$ or 24. For example, the contact $T_3'$ of the upper connector $K_1'$ of the third hydrophone is connected by a wire $W(3, 1)$ to the contact $T_3''$ of the lower connector $K_1''$ thereof.

In this case, as in the foregoing, the contacts $T_{13}$ and $T_{19}, T_{20}, T_{21}, T_{22}, T_{23},$ and $T_{24}$, are connected to the terminals of the preamplifier of the corresponding hydrophone in the same way as previously described.

It will be noted that the first and second contacts $T_1''$ and $T_2''$ of the upper connector are not connected in any way to the amplifiers or to the other connector of the same hydrophone. Similarly, it will be noted that the thirteenth contact of the lower connector is not connected in any way to the amplifier or to any other connector of the same hydrophone.

In the embodiment of the invention illustrated in Fig. 7, the contacts of each of the jumper cables are divided into three groups $g_1$, $g_2$ and $g_3$. In the first group of contacts $g_1$ of each of the jumper cables $C_a$, each of the upper contacts $t_s'$ of the upper connector $k'$ is connected to a corresponding contact $t_s''$ of the lower connector $k''$ by means of a wire $w(s, a)$, where $s=19 \ldots$ or 24, and $a=2 \ldots$ or 6. In each of the cables $C_a$, as before, the wires $w(21, a)$ and $w(24, a)$ are connected by one bridge wire and the wires $w(22, a)$ and $w(23, a)$ are connected by another bridge wire.

The contacts of the second group $g_2$ of contacts of each of the cables are arranged sequentially in six pairs, namely, $t_{2p}$ and $t_{2p-1}$ where $p$ equals 1 . . . or 6. In each cable $C_a$, the first pair $T_1'$ and $T_2'$ of the second group of contacts of the upper connector $k'$ remain unconnected to any of the contacts of the lower connector $k''$, but each of the remaining pairs of contacts $t_{2p}'$ and $t_{2p-1}'$ of the upper connector $k'$ of each cable is connected by means of wires $w(2p-1)$ and $w(2p-1, 1)$ with the $(2p-2)$th and the $(2p-3)$th contacts $t_{2p-2}''$ and $t_{2p-3}''$ of the lower connector $k''$ thereof where $p=2$ . . . or 6. For example, the fourth pair of upper contacts $t_8'$ and $t_7'$ of the first jumper cable $C_1$ are connected by wires $w(8, 1)$ and $w(7, 1)$ with the third pair of lower contacts $t_6''$ and $t_5''$ thereof. In effect, the connections between the upper and lower contacts of the second group $g_2$ are rotated within each of the cables, being retarded or stepped in sequence by two positions as the connections proceed downwardly. By virtue of this arrangement, as before, the output of each preamplifier is advanced or rotated in steps of two between the output connector of each hydrophone $H_a$ and the output connector of the next upper hydrophone $H_{a-1}$ in the series.

Again, as before, as a result of the rotation of the connection in the second group of contacts $g_2$ of the cables, the output of the first hydrophone preamplifier $A_1$ is connected to the input of the first recorder amplifier $P_1$ and the output of the second hydrophone amplifier $A_2$ is connected to the input of the second recorder amplifier $P_2$, and so on, the positions of the hydrophone in the string being coordinated exactly with the positions of the corresponding galvanometers in the multiple-element oscillograph. It will be noted that the last pair of contacts $t_{11}''$ and $t_{12}''$ of the second group of the lower connector $k'$ of each cable remain unused and that all of the wires that are connected thereto by means of connections in the cables and hydrophones therebetween are not connected in any way to the truck equipment.

The contacts of the third group $g_3$ of contacts of each of the cables are arranged sequentially in numerical order $t_{13}$ . . . $t_{18}$. In each cable, the first contact $t_{13}'$ of the upper connector $k_1'$ and the last contact $t_{18}''$ of the lower connector $k''$ in the third group of contacts are not used. Each of the remaining contacts $t_s'$ of the upper connector $k'$ of each cable $C_a$ is connected by means of a wire $w(s, a)$ with the $(s-1)$th contact $t_{s-1}''$ of the lower connector $k''$ thereof, where $s$ equals 14 . . . or 18. For example, the fourth upper contact of the third group of the first jumper cable, namely, contact $t_{16}'$ of the upper connector is connected by wire $w(16, 1)$ with the third lower contact $t_{15}''$ thereof. In effect, the connections between the upper and lower contacts of the third group $g_3$ are rotated within each of the hydrophones, being retarded or stepped in the sequence by one position in each jumper cable as the connections proceed downwardly. By virtue of this arrangement, the testing circuit associated with each piezo-electric detector X is advanced or rotated in steps of one between the output connector of each hydrophone $H_a$ and the output connector of the next upper hydrophone $H_{a-1}$ in the series.

As a result of the rotation of the connections in the second and third groups of contacts $g_2$ and $g_3$ of the cables in this embodiment of the invention, the preamplifiers $A_1$ . . . $A_6$ and the piezo-electric detectors $X_1$ . . . $X_6$ are connected to the recording amplifiers $P_1$ . . . $P_6$ and the testing contacts $S_1$ . . . $S_6$ in the same way as previously. With this arrangement too, any two hydrophones and any two jumper cables may be interchanged without disturbing the coordination between the positions of the hydrophones in the series and the positions of the galvanometers $G_1$ . . . $G_6$ and the testing contacts $S_1$ . . . $S_6$.

In order to achieve the desired interchangeability with the embodiment of the invention illustrated in Fig. 7, it is necessary to exercise care to distinguish between the input connectors $k''$ and the output connectors $k'$ of the cables. This may be done conveniently by keying the upper and the lower connectors of the hydrophones differently and also keying the corresponding input and output connectors of the cables in a corresponding way so that the cables cannot be reversed, though they may be interchanged.

It will be noted that in both embodiments of the invention specifically described, each hydrophone and the cable connected to one end thereof may be considered as an electrical unit and that all the advantages of this invention are obtained by rotating connections between the input connector and the output connector of that unit as a whole in accordance with the principles set forth above.

While the sequences of contacts, testing devices, and galvanometers referred to have all employed a serial spatial relationship, it will be understood that the sequence need not be geometrical but may be numerical without departing from the principles of the invention.

In the embodiments of the invention described above, the correspondence between contacts of the upper and lower connectors is a direct correspondence, in that contacts correspond only if they appear in the same position in the sequence of contacts. However, other types of correspondence between contacts is possible. For example, the invention may be embodied in a system in which the correspondence is of an inverse or reciprocal nature. In such a case, it is only necessary to connect each contact $t_a'$ of the upper connector $k'$ with a contact $t_b''$ of the lower connector $k''$ only if contact $t_a''$ of the lower connector $k''$ is connected with a contact $t_b'$ of the upper connector $k'$ so that the stepping or rotation is completely reversible between the upper and the lower connectors of the cables. To produce such an arrangement, the groups of contacts are arranged in symmetrical groups about a central reference point in the series of contacts.

Other types of correspondence between contacts will now readily occur to those skilled in the art in view of the disclosure above. In any case, where such correspondence exists in any set of electrical units, if identical parts of the respective units are connected to corresponding contacts and the connections between certain contacts are rotated in accordance with this invention, the units may be assembled in any sequence without disturbing the coordination of the positions of the units in the sequence with the positions of individual devices of a series to which the entire assembly is connected.

While the invention has been described above with reference to its application to a certain type of seismic prospecting apparatus, it will be understood that the invention may be embodied in many other forms and may be applied in other fields than seismic prospecting. More particularly, even though the invention has been described with reference to series of certain types of devices, it will be understood that the invention may be applied to other types of devices as well, where it is desired to coordinate the positions of the devices in a first series and the positions of the devices in a second series. Furthermore, even though the invention has been described only with respect to the rotation of connections between the outputs of amplifiers in one series and the inputs of amplifiers in other series, it will be understood that the invention may be applied to coordinate between two sets of transducers or devices of other kinds.

The invention claimed is:

1. In combination, a series of electrical units, each of which includes a transducing means, a first connector and a second connector, both of said connectors having $n$ corresponding contacts, the contacts being sequentially arranged at corresponding points in the respective connectors; a wire connecting the transducing means of each unit with the first contact of the sequence of contacts of the second connector thereof; a wire connecting each $n$th of the remaining contacts of the second connector of each unit with the $(n-1)$th contact of the first connector thereof; means for predeterminedly mating the first connector of each electrical unit but the last in the series with the second connector of the next following electrical unit in the series with the corresponding contacts of each pair of mated connectors electrically connected irrespective of the order of arrangement of the individual electrical units in the series; and a series of devices connected to corresponding contacts of the second connector of the first of said series of electrical units, whereby each of said devices is connected to certain of said transducing means according to their respective positions in the series.

2. In combination, a series of electrical units, each of which includes a transducing means, a first connector and a second connector, both of said connectors having $n$ corresponding contacts, the contacts being sequentially arranged at corresponding points in the respective connectors; $a$ wires connecting the transducing means of each of said units with the first $a$ contacts of the second connector thereof; a wire connecting each of a plurality of the remaining contacts of the second connector of each unit with the $(n-a)$th contact of the first connector thereof; means for mating the first connector of each electrical unit but the last in the series with the second connector of the next following electrical unit in the series with the corresponding contacts of each pair of mated connectors electrically predeterminedly connected irrespective of the order of arrangement of the individual electrical units in the series; and a series of devices connected to corresponding contacts of the second connector of the first of said series of electrical units, whereby each of said devices is connected to certain of said transducing means according to their respective positions in the series.

3. In combination, a series of electrical units, each of which includes a transducing means having a pair of signal terminals and each having power terminals, each unit having a first connector and a second connector, each of said connectors having at least first and second groups of contacts, each of said groups of contacts being sequentially arranged at corresponding points in the respective connectors; a wire connecting each contact of the first group of contacts of the first connector of each unit with the corresponding contact of the second connector thereof, each of said wires being connected to a power terminal of the transducing means of the same unit; a pair of wires connecting the signal terminals of the transducing means of each unit with the first pair of contacts of the second group of contacts of the second connector thereof; a pair of wires connecting each of the remaining pairs of contacts of the second group of contacts of the second connector with the next preceding pair of contacts of the second group of the first connector; a power supply connected to the contacts of the first group of the contacts of the second connector of the first of said series of electrical units; means for mating the first connector of each electrical unit but the last in the series with the second connector of the next following electrical unit in the series with the corresponding contacts of each pair of mated connectors electrically predeterminedly connected irrespective of the order of arrangement of the individual electrical units in the series; and a series of devices connected to corresponding pairs of contacts of the second group of contacts of the second connector of the first electrical unit, whereby each of said devices is connected to certain of said transducing means according to their respective positions in the series.

4. In combination, a series of identical hydrophones, each comprising a sealed case having therein a piezoelectric detector element and an amplifier element having an input and an output, said detector element being connected to the input of said amplifier element, an input connector and a corresponding output connector at the ends of said case, both of said connectors having first, second and third groups of corresponding contacts, the corresponding contacts being located at corresponding points in the respective connectors, pairs of contacts of the second group being sequentially arranged, and the contacts of the third group being sequentially arranged; a wire connecting each contact of the first group of contacts of the output connector of each hydrophone with the corresponding contact of the input connector thereof, each of said wires being connected to a corresponding point of the amplifier of the same unit; a pair of wires connecting the output of the amplifier element in each hydrophone with the first pair of contacts of the second group of contacts of the output connector thereof; two wires connecting each of the remaining pairs of contacts of the second group of contacts of each output connector with the next preceding pair of contacts of the corresponding input connector; a wire connecting the detector element of each unit with a contact of the third group of contacts of the output connector thereof; a wire connecting each of the remaining contacts of the third group of contacts of the output connector of each unit with the next preceding contact of the corresponding input connector, the contacts of the input connector of each hydrophone but the last in the series being connected to the corresponding contacts of the output connector of the next following hydrophone, whereby the connections in the second and third groups of contacts in each hydrophone are advanced in sequence in the respective groups of contacts from unit to unit; a power supply connected to the corresponding output contacts of the first group of contacts of the output connector of the first hydrophone in the series, whereby power is supplied to all of said amplifier elements; means for predeterminedly mating the first connector of each hydrophone but the last with the second connector of the next following hydrophone in the series with the corresponding contacts of each pair of mated connectors electrically connected irrespective of the order of arrangements of the individual electrical units in the series of electrical devices; a series of recording devices connected to corresponding pairs of output contacts of the second group of contacts of the first hydrophone, whereby each of said recording devices is connected to a certain one of said detectors according to their respective positions in the series; and a series of test devices connected to the corresponding output contacts of the third group of contacts of the output connector of the first hydrophone whereby each of said testing devices is connected to a certain one of said detectors according to their positions in the series.

5. In combination, a series of identical hydrophones each comprising a sealed case having therein a piezoelectric detector and an amplifier, said amplifier having an input and an output, the detector being connected to the input of said amplifier, an input connector and a corresponding output connector at the ends of said case, both of said connectors having first, second and third groups of corresponding external contacts, the corresponding contacts being located at corresponding points in the respective connectors, pairs of contacts of the second group being sequentially arranged, and the contacts of the third group being sequentially arranged; a wire connecting each contact of the first group of contacts of the output connector of each hydrophone with the corresponding contact of the input connector thereof, each of said wires being connected to a corresponding point of the amplifier of the same unit; a pair of wires connecting the output of the amplifier in each hydrophone with the first pair of contacts of the second group of contacts of the output connector thereof; two wires connecting each of the remaining pairs of contacts of the second group of contacts of each output connector with the next preceding pair of contacts of the corresponding input connector; a wire connecting the detector of each unit with a contact of the third group of contacts of the output connector thereof; a wire connecting each of the remaining contacts of the third group of contacts of the output connector of each unit with the next preceding contact of the corresponding input connector, all of said wires being arranged in said case; a series of interconnecting cables, each having an input connector and an output connector, said latter connectors having corresponding contacts, the contacts of the output connector of each cable in the series being connected to the corresponding contacts of the input connector of the next preceding hydrophone, the contacts of the input connector of each interconnecting cable being connected to corresponding contacts of the output connector of the next following hydrophone in the series; wires connecting contacts of the input connectors of the respective cables with corresponding contacts of the output connectors thereof, whereby the connections to the hydrophones of each unit in the second and third groups of contacts are advanced in sequence in the respective groups of contacts from unit to unit; means for mating the input connector of each hydrophone but the last in the series with the output connector of the next following interconnecting cable whereby the corresponding contacts of each pair of such mated connectors are electrically predeterminately connected irrespective of the order of arrangement of the individual hydrophones and interconnecting cables in the series; means for mating the output connector of each hydrophone but the first in the series with the input connector of the next preceding interconnecting cable whereby the corresponding contacts of each pair of the latter mated connectors are electrically predeterminately connected irrespective of the order of arrangement of the individual hydrophones and interconnecting cables in the series; a power supply connected to corresponding output contacts of the first group of contacts of the output connector of the last interconnecting cable, whereby power is supplied to all of said amplifiers; a series of recording devices connected to corresponding pairs of output contacts of the second group of contacts of the first hydrophone whereby each of said recording devices is connected to a certain one of said detectors according to their respective positions in the series; and a series of test devices connected to the corresponding output contacts of the third group of contacts of the output connector of the first hydrophone, whereby each of said testing devices is connected to a certain one of said detectors according to their respective positions in the series.

References Cited in the file of this patent

UNITED STATES PATENTS

| | | |
|---|---|---|
| 2,590,531 | McLoad | Mar. 25, 1952 |
| 2,592,780 | Woods | Apr. 15, 1952 |
| 2,717,368 | Swan | Sept. 6, 1955 |